(12) United States Patent
Chang et al.

(10) Patent No.: US 9,881,199 B2
(45) Date of Patent: Jan. 30, 2018

(54) FINGERPRINT IDENTIFICATION DEVICE

(71) Applicant: AU Optronics Corporation, Hsin-Chu (TW)

(72) Inventors: Shih-Hsi Chang, Hsin-Chu (TW); Chung-Lin Fu, Hsin-Chu (TW); Yu-Hsin Ting, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/269,467

(22) Filed: Sep. 19, 2016

(65) Prior Publication Data

US 2017/0206395 A1 Jul. 20, 2017

(30) Foreign Application Priority Data

Jan. 20, 2016 (TW) .................... 105101625

(51) Int. Cl.
 *G06K 9/00* (2006.01)
(52) U.S. Cl.
 CPC ....... *G06K 9/0004* (2013.01); *G06K 9/00087* (2013.01)
(58) Field of Classification Search
 CPC ............. G06K 9/0004; G06K 9/00087; G06K 9/00046; G06K 9/00013; G06K 9/0012; G02B 3/0006; G02B 27/30; G02B 5/201; G02B 3/0062; G02B 6/0046; G02B 3/0087

See application file for complete search history.

(56) References Cited

U.S. PATENT DOCUMENTS

| 2011/0026559 A1 | 2/2011 | Bagshaw et al. |
| 2012/0105614 A1 | 5/2012 | Wu et al. |
| 2017/0228579 A1* | 8/2017 | Zhu .................... G06K 9/00013 |

FOREIGN PATENT DOCUMENTS

| CN | 102467660 | 5/2012 |
| CN | 202632317 | 12/2012 |
| TW | TW201101196 | 1/2011 |
| TW | M401814 | 4/2011 |
| TW | M450656 | 4/2013 |

OTHER PUBLICATIONS

Taiwan Intellectual Property Office, Office Action dated Oct. 19, 2016.

* cited by examiner

*Primary Examiner* — Ruiping Li
(74) *Attorney, Agent, or Firm* — WPAT, PC

(57) ABSTRACT

A fingerprint identification device includes a backlight module and a sensing module. The sensing module is disposed on the backlight module. The sensing module includes a plurality of light sensing units and a plurality of light converting units. Each of the light converting units is disposed on a respective one of the light sensing units. The backlight module emits a first color light, the first color light passes through gaps between the light sensing units and then is reflected to the light converting unit, and the light converting unit converts the first color light into a second color light, such that the light sensing unit senses the second color light.

5 Claims, 2 Drawing Sheets

FINGERPRINT IDENTIFICATION DEVICE

TECHNICAL FIELD

The present disclosure relates to a fingerprint identification device, and more particularly to a fingerprint identification device capable of effectively reducing power losses.

BACKGROUND ART

Fingerprint identification uses unique fingerprint information of a human finger for identification. For a common fingerprint identification device, a complete fingerprint image is taken by a fingerprint sensor, and then is subjected to a fingerprint identification algorithm for fingerprint image processing and fingerprint minutiae extraction, so as to compare fingerprints. There are two common types of fingerprint identification devices, capacitive and optical. Optical fingerprint identification devices record fingerprints by means of a light source, a reflecting surface, and a photosensitive element. In use, a finger presses on the reflecting surface, crests and troughs of a fingerprint thereof reflect light, and an image is captured through the photosensitive element. Since crests and troughs of fingerprints are different in light reflecting intensity, a difference in scale is reflected after the photosensitive element senses the light intensity, thereby achieving the effect of fingerprint identification.

At present, optical fingerprint identification devices have a problem of insufficient light transmission due to the film layers and the structure blocking the light and the finger affecting the light reflectivity and absorptivity. Therefore, for the purpose of enabling the photosensitive element to sense sufficient light to stay capable of fingerprint identification, luminous intensity of the light source needs to be increased. However, the increase of the luminous intensity of the light source results in increased power losses and thus increased overall power consumption of the fingerprint identification device.

SUMMARY OF THE INVENTION

The present disclosure provides a fingerprint identification device capable of effectively reducing power losses to address the problem described above.

According to one embodiment, the fingerprint identification device of the present disclosure comprises a backlight module and a sensing module. The sensing module is disposed on the backlight module. The sensing module comprises a plurality of light sensing units and a plurality of light converting units. Each of the light converting units is disposed on a respective one of the light sensing units. The backlight module emits a first color light, the first color light passes through gaps between the light sensing units and then is reflected to the light converting unit, and the light converting unit converts the first color light into a second color light, such that the light sensing unit senses the second color light.

According to another embodiment, the fingerprint identification device of the present disclosure comprises a backlight module and a sensing module. The sensing module is disposed on the backlight module. The sensing module comprises a plurality of light sensing units and a plurality of light converting units. Each of the light converting units is disposed on a respective one of the light sensing units. The backlight module emits a first color light and the light converting unit converts the first color light into a second color light, wherein the first color light has a wavelength between 600 nm and 850 nm, and the second color light has a wavelength between 450 nm and 550 nm.

To sum up, in the present disclosure, the light converting unit is disposed on the light sensing unit to convert the first color light emitted by the backlight module and reflected by the finger into the second color light, which is then sensed by the light sensing unit, wherein the first color light may be a red light having a wavelength between 600 nm and 850 nm and the second color light may be a green light having a wavelength between 450 nm and 550 nm. The skin of a human finger has a greater reflectivity for a red band, so using a red light as the light source can increase the intensity of reflected light. Moreover, converting the red light into the green light with the light converting unit can increase the sensing capability of the light sensing unit which has better capability of sensing a green band. Through the present disclosure, the intensity of the light reflected by the finger and the sensing capability of the light sensing unit can be increased, and therefore the capability of fingerprint identification can sustain without having to increase the luminous intensity of the backlight module. Thus, power losses of the backlight module can be effectively reduced.

The advantages and spirit of the present disclosure can be further understood through the following detailed description of the invention and accompanying drawings.

BRIEF DESCRIPTIONS OF THE DRAWINGS

DETAILED DESCRIPTIONS OF THE INVENTION

Figure 1:
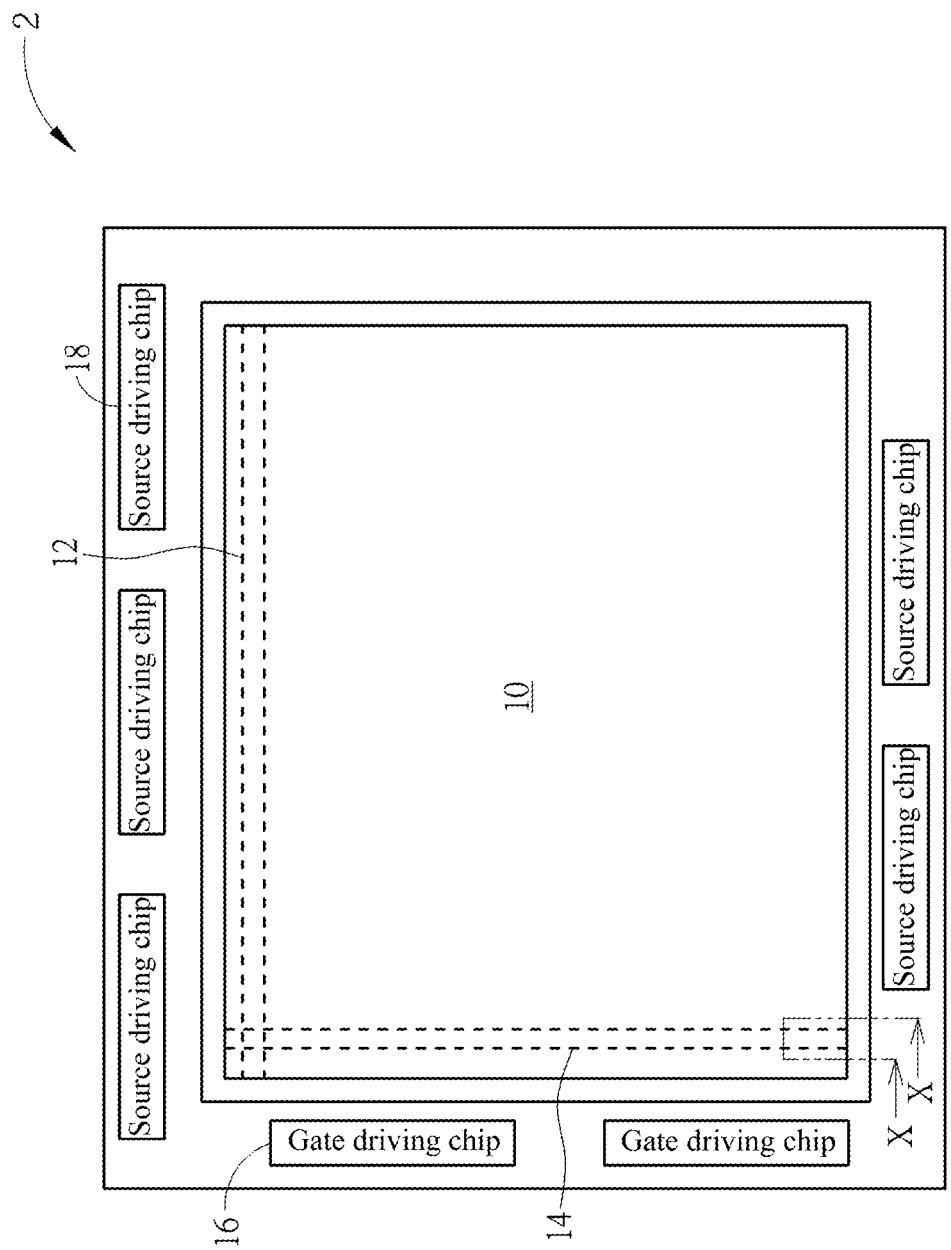
FIG. 1 is a top view of a fingerprint identification device according to one embodiment of the present disclosure.
Figure 2:
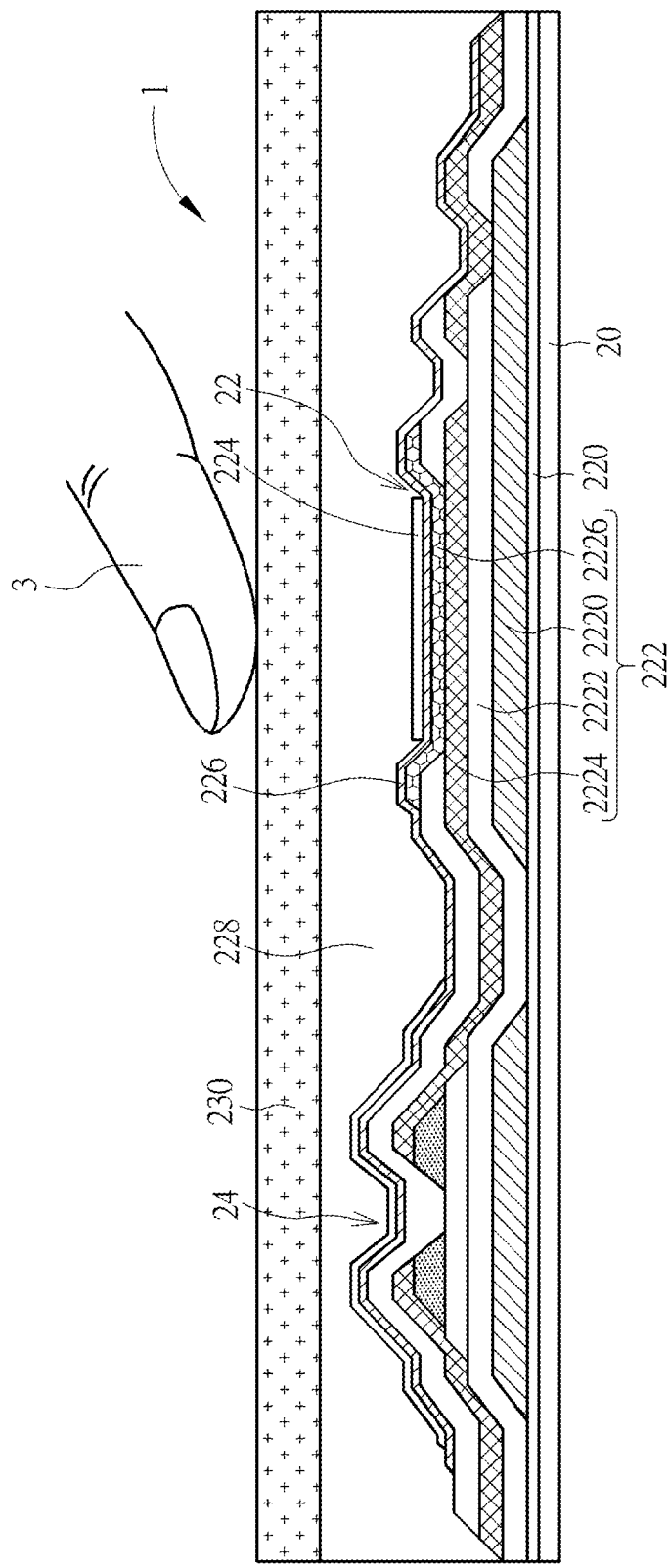
FIG. 2 is a sectional view along an X-X line of the fingerprint identification device in FIG. 1.

Referring to FIG. 1 and FIG. 2, FIG. 1 is a top view of a fingerprint identification device 1 according to one embodiment of the present disclosure and FIG. 2 is a sectional view along an X-X line of the fingerprint identification device 1 in FIG. 1. As shown in FIG. 1, the fingerprint identification device 1 comprises an active area (AA) 10, a plurality of scanning lines 12, a plurality of data lines 14, at least one gate driving chip 16, and at least one source driving chip 18. The principles of the active area 10, the scanning lines 12, the data lines 14, the gate driving chip 16, and the source driving chip 18 are well-known by one skilled in the art and will not be described herein.

As shown in FIG. 2, the fingerprint identification device 1 further comprises a backlight module 20, a sensing module 22, and a switch element array 24. The sensing module 22 is disposed on the backlight module 20. In this embodiment, the backlight module 20 may be a direct back-lit backlight module or an edge-lit-type backlight module depending on the actual applications. For example, a gap between the backlight module 20 and the sensing module 22 exists or does not exist. The sensing module 22 comprises a plurality of light sensing units 222 and a plurality of light converting units 224. In this embodiment, the plurality of light sensing units 222 are disposed on a transparent substrate 220 in an array arrangement corresponding to the active area 10. In addition, the switch element array 24 is also disposed on the transparent substrate 220 in an array arrangement corresponding to the active area 10 and is electrically connected to the light sensing units 222. In this embodiment, the switch element array 24 may be formed of a plurality of thin film transistors (TFTs). The plurality of TFTs is electrically connected to the corresponding scanning lines 12 and data lines 14, respectively. It should be noted that, the construction and principle of TFT switches are well-known by one skilled in the art and will not be described herein. For the convenience of description and viewing, FIG. 2 only shows one switch element, one light sensing unit 222, and one light converting unit 224. However, one skilled in the art can accordingly understand the way the switch element array 24, and the plurality of light sensing units 222 and the plurality of light converting units 224 in the sensing module 22 are disposed and not limiting the present disclosure thereto.

The light sensing unit 222 comprises a first metal layer 2220, an insulating layer 2222, a second metal layer 2224, and a light sensing layer 2226, wherein the first metal layer 2220 is disposed on the transparent substrate 220, the insulating layer 2222 is disposed on the first metal layer 2220, the second metal layer 2224 is disposed on the insulating layer 2222, and the light sensing layer 2226 is disposed on the second metal layer 2224. In this embodiment, the light sensing unit 222 and the switch element array 24 may be formed in the same process, so the light sensing layer 2226 may be covered with a transparent conducting layer 226. The light sensing layer 2226 is made of, for example, a silicon-rich oxide. The transparent conducting layer 226 is made of, for example, indium tin oxide (ITO). After the light sensing unit 222 and the switch element array 24 are formed, a flat layer 228 may be further disposed on the light sensing unit 222 and the switch element array 24, and a multi-layer optical coating 230 may be disposed on the flat layer 228 to enhance the surface hardness or the light control degree, but the present disclosure is not limited thereto.

Each of the light converting units 224 is disposed on a respective one of the light sensing units 222. In this embodiment, the light converting unit 224 may be a frequency-doubling crystal or a fluorescent film layer.

In identifying a fingerprint, a user can put his/her finger 3 on the fingerprint identification device 1, and a first color light emitted by the backlight module 20 passes through gaps which are between the transparent substrate 220 and the light sensing units 222 and may be not shielded by the first metal layers 2220 and the second metal layers 2224 and then is reflected by the finger 3 to the light converting unit 224. At this time, the light converting unit 224 converts the first color light emitted by the backlight module 20 into a second color light, such that the light sensing unit 222 senses the second color light.

In this embodiment, the first color light may have a wavelength between 600 nm and 850 nm and the second color light may have a wavelength between 450 nm and 550 nm. Further, the first color light may be a red light having a wavelength between 600 nm and 850 nm and the second color light may be a green light having a wavelength between 450 nm and 550 nm. The skin of a human finger has a greater reflectivity for a red band, so using a red light as the light source can increase the intensity of reflected light. Moreover, the light sensing unit 222 has better capability of sensing a green band, so converting the red light into the green light with the light converting unit 224 can increase the sensing capability of the fingerprint identification device 1.

To sum up, in the present disclosure, the light converting unit is disposed on the light sensing unit to convert the first color light emitted by the backlight module and reflected by the finger into the second color light, which is then sensed by the light sensing unit. Since the first color light emitted by the backlight module can increase the intensity of the light reflected by the finger and the second color light obtained through conversion by the light converting unit can increase the sensing capability of the fingerprint identification device, the capability of fingerprint identification can sustain without having to increase the luminous intensity of the backlight module. Thus, power losses of the backlight module can be effectively reduced.

The above description only provides preferred embodiments of the present invention, and all equivalent changes and modifications made according to the claims of the present invention falls within the scope of the present invention.

What is claimed is:

1. A fingerprint identification device, comprising:
a backlight module for emitting a first color light; and
a sensing module, comprising:
 a plurality of light sensing units; and
 a plurality of light converting units, each of the light converting units disposed on a respective one of the light sensing units;
wherein the first color light passes through the gaps between the light sensing units and then is reflected to the light converting unit, the light converting unit converts the first color light into a second color light, and the light sensing unit senses the second color light.

2. The fingerprint identification device according to claim 1, wherein the light converting unit is a frequency-doubling crystal or a fluorescent film layer.

3. The fingerprint identification device according to claim 1, wherein the first color light has a wavelength between 600 nm and 850 nm and the second color light has a wavelength between 450 nm and 550 nm.

4. The fingerprint identification device according to claim 1, wherein the light sensing unit comprises:
a first metal layer, disposed on a transparent substrate;
an insulating layer, disposed on the first metal layer;
a second metal layer, disposed on the insulating layer; and
a light sensing layer, disposed on the second metal layer.

5. The fingerprint identification device according to claim 1, further comprising a switch element array electrically connected to the light sensing units.

* * * * *